United States Patent
Batiste (10) Patent No.: US 6,916,110 B2
(45) Date of Patent: Jul. 12, 2005

(54) FLAME SIMULATING DEVICES FOR USE WITH LIGHTS AND METHOD THEREOF

(76) Inventor: Rene C. Batiste, 5932 W. Washburn Rd., Las Vegas, NV (US) 89130

( * ) Notice: Subject to any disclaimer, the term of this patent is extended or adjusted under 35 U.S.C. 154(b) by 64 days.

(21) Appl. No.: 10/447,768

(22) Filed: May 29, 2003

(65) Prior Publication Data
US 2004/0240225 A1 Dec. 2, 2004

(51) Int. Cl.[7] ................................................. B60Q 1/32
(52) U.S. Cl. ........................ 362/507; 362/509; 362/351
(58) Field of Search ................................ 362/507, 509, 362/806, 351, 810

(56) References Cited

U.S. PATENT DOCUMENTS

| | | | | |
|---|---|---|---|---|
| 1,148,650 | A | * | 8/1915 | Beauchamp ................. 362/509 |
| 2,089,927 | A | * | 8/1937 | Stechert ...................... 362/300 |
| 3,952,284 | A | | 4/1976 | Martin |
| 4,024,495 | A | | 5/1977 | O'Brien |
| 4,051,218 | A | | 9/1977 | Hotton |
| 4,143,412 | A | | 3/1979 | Sassmannshausen |
| 4,163,275 | A | | 7/1979 | Weber et al. |
| 4,383,290 | A | * | 5/1983 | Binder et al. ................ 362/518 |
| 4,403,943 | A | | 9/1983 | Stella et al. |
| 4,511,326 | A | | 4/1985 | Lacroix |
| 4,658,335 | A | | 4/1987 | Culler |
| 4,670,818 | A | * | 6/1987 | Moebius ....................... 362/538 |
| 4,734,697 | A | | 3/1988 | Robinson et al. |
| 4,796,165 | A | | 1/1989 | Metti |
| 4,807,101 | A | | 2/1989 | Milde |
| 4,811,173 | A | | 3/1989 | Johnson |
| 4,851,813 | A | | 7/1989 | Gottlieb |
| 4,855,877 | A | * | 8/1989 | Otaka ......................... 362/509 |
| 4,903,007 | A | | 2/1990 | Gottlieb |
| 4,994,942 | A | | 2/1991 | Georgeff |
| D316,461 | S | | 4/1991 | McGlothlin |
| D318,537 | S | | 7/1991 | Allman |
| 5,038,983 | A | | 8/1991 | Tomososki |
| 5,067,778 | A | | 11/1991 | Testardi |
| 5,122,902 | A | | 6/1992 | Benson |
| 5,181,019 | A | | 1/1993 | Gottlieb et al. |
| 5,289,348 | A | | 2/1994 | Miller |
| 5,371,429 | A | | 12/1994 | Manna |
| 5,389,823 | A | | 2/1995 | Hopkins et al. |
| 5,420,482 | A | | 5/1995 | Phares |
| 5,433,039 | A | | 7/1995 | Hawkins et al. |

(Continued)

Primary Examiner—Sandra O'Shea
Assistant Examiner—Jacob Y. Choi
(74) Attorney, Agent, or Firm—Harry M. Weiss; Weiss, Moy & Harris, P.C.

(57) ABSTRACT

A flame simulating device for a vehicle is disclosed. The flame simulating device comprises an assembly having a flame shaped end and an opposite end. In several examples of the flame simulating device the opposite end of a member of the assembly is coupled to a transparent member. In use of the flame simulating device, a portion of the opposite end of the assembly is coupled to a portion of a surface of a vehicle light lens fixture. The flame simulating device preferably comprises translucent plastic, except when a member of the assembly is the transparent member. The flame simulating device may be colored and textured to give the appearance of flames emanating from a vehicle. A source of light creates a simulated flame when the source of light is directed onto the translucent flame simulating device.

20 Claims, 4 Drawing Sheets

U.S. PATENT DOCUMENTS

| | | |
|---|---|---|
| D364,704 S | 11/1995 | Alger |
| 5,498,910 A | 3/1996 | Hopkins et al. |
| 5,519,588 A | 5/1996 | Sobeck et al. |
| RE35,686 E | 12/1997 | Robinson et al. |
| D387,469 S | 12/1997 | Saleen |
| 5,740,314 A | 4/1998 | Grimm |
| 5,760,545 A | 6/1998 | Mikel |
| 5,770,283 A | 6/1998 | Gosselin et al. |
| 5,793,308 A | 8/1998 | Rosinski et al. |
| 5,797,672 A | 8/1998 | Dobert |
| 5,835,868 A | 11/1998 | McElroy et al. |
| 5,842,615 A | 12/1998 | Goodness |
| 5,845,990 A | 12/1998 | Hymer |
| 5,857,767 A | 1/1999 | Hochstein |
| 5,872,656 A | 2/1999 | Horwill et al. |
| 5,890,796 A | 4/1999 | Marinelli et al. |
| 5,896,084 A | 4/1999 | Weiss et al. |
| 5,909,174 A | 6/1999 | Dietz et al. |
| 5,927,272 A | 7/1999 | Robertson |
| D413,687 S | 9/1999 | Darby |
| 6,042,328 A | 3/2000 | McVaugh |
| 6,095,672 A | 8/2000 | Beninga et al. |
| 6,220,737 B1 | 4/2001 | Baragona |
| 6,232,722 B1 | 5/2001 | Bryant et al. |
| 6,265,829 B1 | 7/2001 | Perdec |
| 6,344,846 B1 | 2/2002 | Hines |
| 6,352,359 B1 | 3/2002 | Shie et al. |
| 6,394,635 B1 * | 5/2002 | Temme et al. ............... 362/509 |
| 6,406,168 B1 | 6/2002 | Whiting |
| 6,441,549 B1 | 8/2002 | Trentelman |
| D463,049 S | 9/2002 | Yang |
| D463,612 S | 9/2002 | Huang |
| 6,449,870 B1 | 9/2002 | Perez et al. |
| D464,449 S | 10/2002 | Yang |
| 6,499,405 B1 | 12/2002 | Ambrico |
| 6,520,669 B1 | 2/2003 | Chen et al. |
| D471,664 S | 3/2003 | Huang |
| 2002/0080601 A1 * | 6/2002 | Meltzer ....................... 362/96 |
| 2003/0031847 A1 | 2/2003 | Numrich et al. |

* cited by examiner

FLAME SIMULATING DEVICES FOR USE WITH LIGHTS AND METHOD THEREOF

FIELD OF THE INVENTION

This invention relates generally to flame simulating devices and methods therefor, and, more specifically, to devices coupled to vehicle light lens fixtures giving the appearance of flames emanating from the vehicle.

BACKGROUND OF THE INVENTION

In the past, there has been a continual fascination with fire and the flames that emanate from a fire. People have used flame symbols in many ways to symbolize power, anger, passion, vitality and mystery. The mastery of fire led to people's ability to make technological progress.

Currently, many people like to apply designs of flames to a variety of objects including their vehicles. This is particularly true in the automotive and motorcycle aftermarket industry where stickers, exterior paintings, interior components, accessories and apparel are marked with flame designs. Such designs have a great appeal to many consumers.

In the case of exterior designs, many consumers particularly like flame designs because they give the impression of speed. Unfortunately, these designs are generally not highly visible during the night. Luminescent paints help in this regard.

Another approach to resolve the issue of night-time visibility of flame designs is to use the existing illumination of a vehicle. While there are add-on devices that protect vehicle lights from debris and may have flame designs applied to them, none make use of the vehicle lights to enhance the appearance of flames emanating from the vehicle.

For the foregoing reasons, there is a need to provide devices attached to light lens fixtures of vehicles giving the appearance of flames emanating from vehicles. The present invention provides the appearance of flames emanating from a vehicle by using vehicle lights as a source of reflecting and diffusing light in appropriate flame simulating devices. The flame simulating devices are easily attached to existing vehicle lights.

SUMMARY OF THE INVENTION

Accordingly, it is an object of this invention to provide improved flame simulating devices and methods therefor.

It is a further object of this invention to provide improved flame simulating devices for coupling to lights of vehicles and methods therefor.

It is a still further object of this invention to provide improved flame simulating devices for coupling to lights of automobiles, motorcycles, trucks, trailers or bicycles and methods therefor.

It is a still further object of this invention to include a method for providing flame simulating devices illuminated by a vehicle light.

PREFERRED EMBODIMENTS OF THE INVENTION

A flame simulating device for a vehicle is disclosed. In accordance with one embodiment of this invention, a flame simulating device for a vehicle comprises in combination a source of light coupled to the vehicle; and a translucent flame simulating device coupled to the vehicle that creates a simulated flame when the source of light is directed onto the translucent flame simulating device. The light source is a vehicle light. The flame simulating device further comprises an assembly, a portion of the assembly having a flame shaped end, the assembly having an opposite end, a portion of the opposite end for coupling to a portion of an outer surface of a vehicle light lens fixture giving the appearance of flames emanating from the vehicle light lens fixture. Alternatively, the opposite end of the assembly is coupled to a portion of a surface surrounding a vehicle light lens fixture giving the appearance of flames emanating from areas surrounding the vehicle light lens fixture.

In one example, the assembly comprises an essentially rectangular member, a portion of the essentially rectangular member near the opposite end defining a multiplicity of holes for allowing access to retaining couplers of the vehicle light lens fixture. The assembly further comprises a second essentially rectangular member, the second essentially rectangular member substantially perpendicular to the first essentially rectangular member; an edge of the essentially rectangular second member is coupled to a portion of an inner surface of the essentially rectangular first member; a portion of the inner surface of the essentially rectangular first member and an inner surface of the essentially rectangular second member for coupling to a portion of the outer surface of the vehicle light lens fixture. Alternatively, the assembly further comprises a second essentially rectangular member having a flame shaped end, the second essentially rectangular member having an opposite end; the opposite end of the second essentially rectangular member for coupling to a portion of another outer surface of the vehicle light lens fixture, the second essentially rectangular member substantially perpendicular to the first essentially rectangular member when the first essentially rectangular member is coupled to a portion of the outer surface of the vehicle light lens fixture. Alternatively, the assembly further comprises a third essentially rectangular member having a flame shaped end and an opposite end; the third essentially rectangular member substantially perpendicular to the first essentially rectangular member, the third essentially rectangular member substantially perpendicular to the second rectangular member; the opposite end of the third essentially rectangular member is coupled to a second edge of the second essentially rectangular member; the essentially rectangular first member, the essentially rectangular second member and the third rectangular member for coupling to a portion of outer surfaces of the vehicle light lens fixture. Alternatively, the assembly further comprises a third essentially rectangular member having a flame shaped end and an opposite end; the third essentially rectangular member substantially perpendicular to the first essentially rectangular member, the third essentially rectangular member substantially perpendicular to the second rectangular member; the opposite end of the third essentially rectangular member is coupled to a portion of an inner surface of the second essentially rectangular member; the essentially rectangular first member, the essentially rectangular second member and the third rectangular member for coupling to a portion of outer surfaces of the vehicle light lens fixture.

In another example, the assembly comprises an essentially cylindrical member, the flame shaped end essentially circularly disposed at one end of the essentially cylindrical member, the essentially cylindrical member having a lip at the opposite end of the essentially cylindrical member, a portion of the lip for coupling to a portion of the outer surface of the vehicle light lens fixture giving the appearance of flames emanating from a rim of the vehicle light lens fixture. The lip is substantially perpendicular to a wall of the essentially cylindrical member, the lip defining an opening of the essentially cylindrical member so that light emanating from the vehicle light lens fixture gives the appearance of flames. The lip is coupled to a transparent member; each one of the lip and the transparent member for coupling to a portion of the outer surface of the vehicle light lens fixture.

In yet another example, the assembly comprises a pair of tapering members and a support cross member, each one of the pair of tapering members having a base coupled to the support cross member, a tapering member of the pair of tapering members is substantially perpendicular to another tapering member of the pair of tapering members, the support cross member for coupling to a portion of the outer surface of the vehicle light lens fixture. The support cross member is coupled to a transparent member; each one of the support cross member and the transparent member for coupling to a portion of the outer surface of the vehicle light lens fixture. The support cross member is coupled to a lip; each one of the support cross member and the lip for coupling to a portion of the outer surface of the vehicle light lens fixture. The support cross member is coupled to a transparent member, the lip is coupled to the transparent member; each one of the support cross member, the lip and the transparent member for coupling to a portion of the outer surface of the vehicle light lens fixture.

In yet another example, the assembly comprises a partially curved member defining a curved portion of a portion of the opposite end of the partially curved member, the partially curved member defining a flame portion extending from another portion of the opposite end to the flame shaped end, the curved portion and the flame portion at the opposite end of the partially curved member defining an opening; each one of the curved portion and the flame portion of the opposite end for coupling to a portion of the outer surface of the vehicle light lens. The assembly further comprises a transparent member coupled to the opposite end of the partially curved member; each one of the opposite end and the transparent member for coupling to a portion of the outer surface of the vehicle light lens fixture.

The flame simulating device comprises translucent plastic.

A method for giving the appearance of flames emanating from a vehicle is disclosed. In accordance with a second embodiment of this invention, the method comprises the steps of providing a source of light coupled to the vehicle: and coupling a translucent flame simulating device to the vehicle that creates a simulated flame when the source of light is directed on the translucent flame simulating device.

The foregoing and other objects, features, and advantages of the invention will be apparent from the following, more detailed description of the preferred embodiments of the invention, as illustrated in the accompanying drawings.

DESCRIPTION OF THE INVENTION

Figure 1:
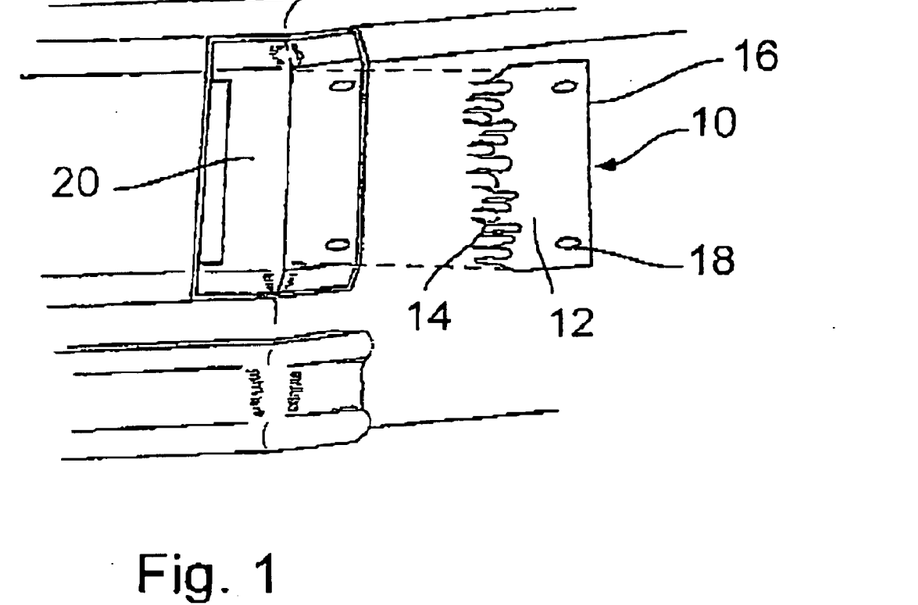
FIG. 1 is a perspective view of a vehicle light lens fixture and a first embodiment of a flame simulating device in position to be coupled to the vehicle light lens fixture in accordance with this invention.
Figure 2:
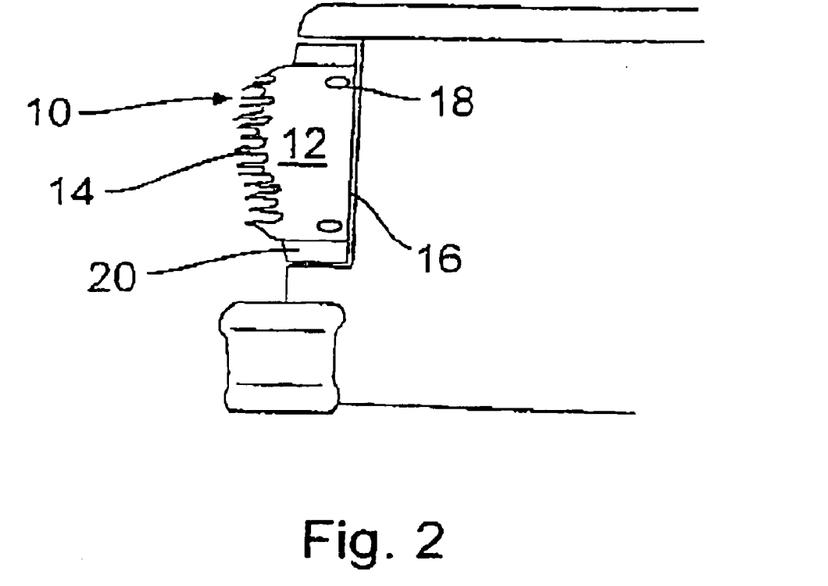
FIG. 2 is a front elevation view of the first embodiment of the flame simulating device of FIG. 1 coupled to the vehicle light lens fixture.

According to FIGS. 1 and 2, in a first example of a flame simulating device 10 an essentially rectangular flame simulating member 12 comprises a flame shaped end 14 at one end of the essentially rectangular flame simulating member 12 and an opposite end 16 of the essentially rectangular flame simulating member 12. A portion of the essentially rectangular flame simulating member 12 near the opposite end 16 of the essentially rectangular flame simulating member 12 defines a multiplicity of holes 18 for allowing access to couplers such as screws of a vehicle light lens fixture 20 when it is desired to replace any bulbs of the vehicle light lens fixture 20. In use, the essentially rectangular flame simulating member 12 is coupled to a portion of a surface of a member of the vehicle light lens fixture 20 preferably by means of an adhesive such as a pressure sensitive, hot melt and/or liquid adhesive. The adhesive is preferably applied to an inner surface portion near the opposite end 16 of the essentially rectangular flame simulating member 12. When the essentially rectangular flame simulating member 12 is coupled to the portion of the surface of the member of the vehicle light lens fixture 20 the flame shaped end 14 projects beyond a portion of a surface of a substantially perpendicular member of the vehicle light lens fixture 20. The first example of the flame simulating device 10 provides the appearance of flames emanating from an edge portion of the surface of the substantially perpendicular member of the vehicle light lens fixture 20.

Figure 3:
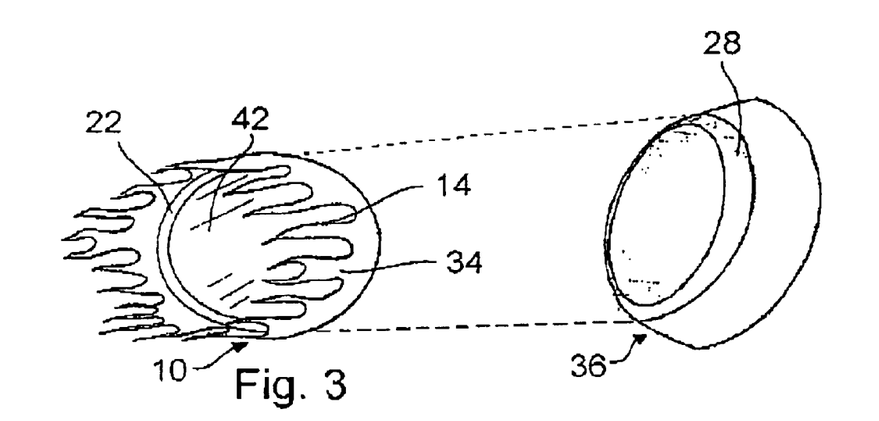
FIG. 3 is a perspective view of a second embodiment of a flame simulating device coupled to another type of vehicle light lens fixture.

FIG. 3 is a second example of a flame simulating device 10, comprising an essentially cylindrical flame simulating member 34 in which a flame shaped end 14 is essentially circularly disposed at one end of the essentially cylindrical flame simulating member 34 and a lip 22 is at an opposite end 16 of the essentially cylindrical flame simulating member 34. The lip 22 is substantially perpendicular to a cylindrical wall of the flame shaped end 14. In a first variation of this example of the flame simulating device 10 the lip 22 defines an opening 42 so that, in use, the lip 22 is coupled to a portion of an outer surface of an essentially circularly shaped light lens fixture 36. In a second variation of the second example of the flame simulating device 10 the lip 22 is coupled to an essentially circular transparent member. In use, the essentially circular transparent member is coupled to a portion of an outer surface of the essentially circularly shaped light lens fixture 36 and the lip 22 is also coupled to a portion of the outer surface of the essentially circularly shaped light lens fixture 36. It will be appreciated that the lip 22 may either be directed inwardly as shown in FIG. 3 or outwardly from a surface of the cylindrical wall at the opposite end 16 of the essentially cylindrical flame simulating member 34. Either one of the configurations for the lip 22 lead to the same coupling methods and configurations described above. The second examples of the flame simulating device 10 provide the appearance of flames emanating circularly from a rim 28 of the essentially circularly shaped light lens fixture 36.

Figure 4:
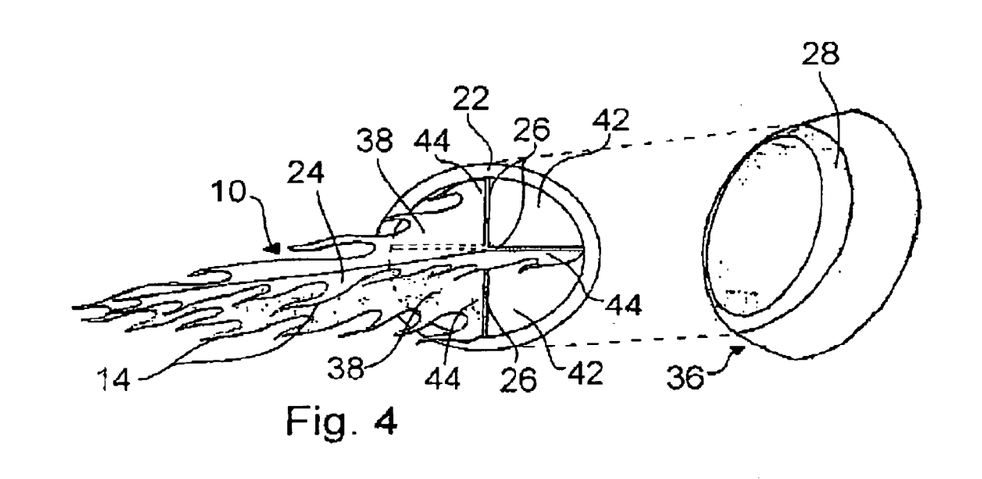
FIG. 4 is a perspective view of a third embodiment of a flame simulating device coupled to another type of vehicle light lens fixture.

FIG. 4 is a third example of a flame simulating device 10, comprising a pair of tapering flame simulating members 24, 38 and each one of the pair of tapering flame simulating members 24, 38 having a base 44 coupled to a support cross member 26. The tapering flame simulating member 24 is substantially perpendicular to the tapering flame simulating member 38. A portion of a back surface of the support cross member 26 provides a coupling surface for the flame stimulating device 10 to a portion of an outer surface of an essentially circularly shaped light lens fixture 36. In a first variation of the third example of the flame simulating device 10, in use, the support cross member 26 is coupled to a portion of the surface of the lens of the essentially circularly shaped light lens fixture 36. In a second variation of the third example of the flame simulating device 10, the support cross member 28 is coupled to a portion of a surface of an essentially circular transparent member and, in use, the essentially circular transparent member as well as the support cross member 26 are coupled to a portion of the outer surface of the essentially circularly shaped light lens fixture 36. In a third variation of the third example of the flame simulating device 10, the support cross member 26 is coupled to a lip 22 to provide enhanced surface area and, in use, the support cross member 26 and the lip 22 of the flame simulating device 10 are coupled to a portion of the outer surface of the essentially circularly shaped light lens fixture 36. In a fourth variation of the third example, both the lip 22 and the essentially circular transparent member are coupled to the cross support member 26 to provide even greater coupling stability and in use, the support cross member 26, the lip 22 and the essentially circular transparent member may all be coupled to a portion of the outer surface of the essentially circular shaped light lens fixture 36. In FIG. 4 any one of the third examples of the flame simulating device 10 are shown coupled to the outer surface of the essentially circularly shaped light lens fixture. 36 with a substantially circular vehicle rim 26 of the essentially circularly shaped light lend fixture 36 in the background behind the plane of the support cross member 26. The third examples of the flame simulating device 10 provide the appearance of flames emanating from an outer surface portion of the essentially circularly shaped light lens fixture 36.

Figure 5:
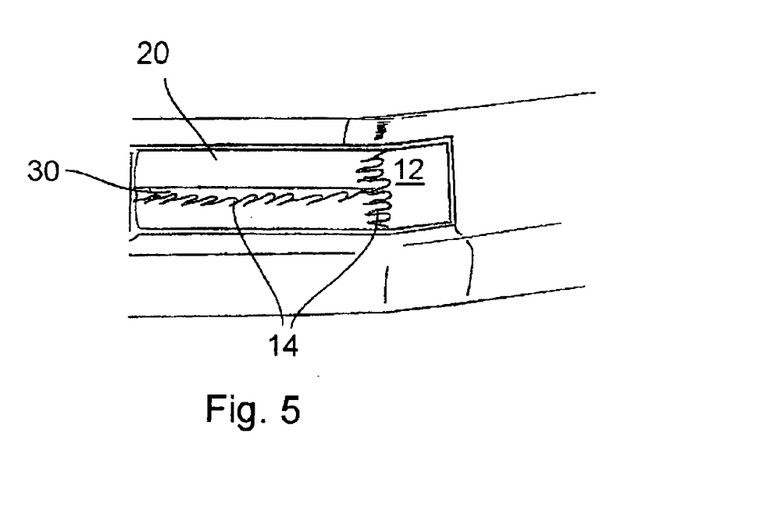
FIG. 5 is a perspective view of the vehicle light lens fixture of FIG. 1 and a first example of a fourth embodiment of a flame simulating device coupled to the vehicle light lens fixture.

Referring to FIG. 5, a fourth example of a flame simulating device 10 comprises a pair of essentially rectangular flame simulating members 12, 30. Each one of the essentially rectangular flame simulating members 12, 30 comprises a flame shaped end 14 at one end of each one of the essentially rectangular flame simulating member 12, 30 and an opposite end 16 of each one of the essentially rectangular flame simulating member 12, 30. In a first variation of the fourth example of the flame simulating device 10, each of the essentially rectangular flame simulating members 12, 30 are separate members. In use, the essentially rectangular flame simulating member 12 is coupled to a portion of a surface of a member of the vehicle light lens fixture 20 preferably by means of an adhesive such as a pressure sensitive, hot melt and/or liquid adhesive. The adhesive is preferably applied to an inner surface portion near the opposite end 16 of the essentially rectangular flame simulating member 12. When the essentially rectangular flame simulating member 12 is coupled to the surface of the member of the vehicle light lens fixture 20 the flame shaped end 14 projects beyond a portion of a surface of a substantially perpendicular member of the vehicle light lens fixture 20. In use, the opposite end 16 of the essentially rectangular flame simulating member 30 is coupled preferably by means of an adhesive such as a pressure sensitive, hot melt and/or liquid adhesive to a portion of a surface of the substantially perpendicular member of the vehicle light lens fixture 20 and projects outwardly from a portion of the surface of the substantially perpendicular member of the vehicle light lens fixture 20. In use, the essentially rectangular flame simulating member 12 is substantially perpendicular to the essentially rectangular flame simulating member 30 when each of the essentially rectangular members 12, 30 are coupled to a portion of surfaces of the vehicle light lens fixture 20.

Figure 5A:
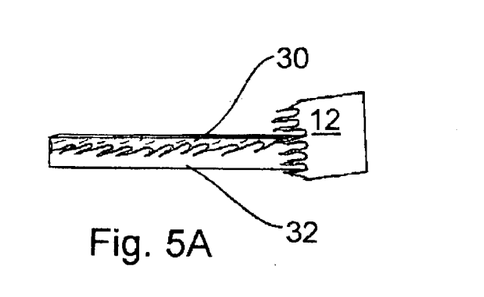
FIG. 5A is a perspective view of a second example of the fourth flame embodiment of the flame simulating device of FIG. 5.
Figure 5B:
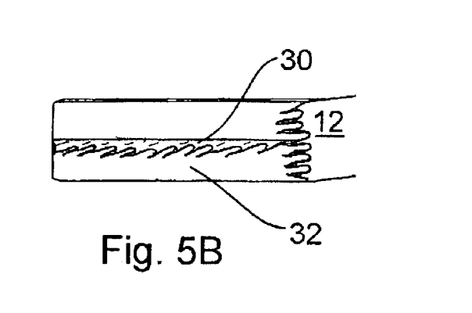
FIG. 5B is a perspective view of a third example of the fourth embodiment of the flame simulating device of FIG. 5.

Referring to FIG. 5A, a second variation of the fourth example of the flame simulating device of FIG. 5 comprises an essentially rectangular flame simulating member 12 substantially perpendicular to an essentially rectangular flame simulating member 30 and an essentially rectangular member 32, which is substantially perpendicular to each one of the essentially rectangular flame simulating members 12, 30. The essentially rectangular flame simulating member 30 is substantially perpendicular to a rectangular member 32 at an end 16 of the essentially rectangular flame simulating member 30 opposite a flame shaped end 14 of the essentially rectangular flame simulating member 30. The rectangular member 32 is also substantially perpendicular to a portion of an inner surface of the essentially rectangular flame simulating member 12. In use, the second variation of the fourth example of the flame simulating device 10 is coupled to a portion of each one of a surface of a member and a substantially perpendicular member of a vehicle lens fixture 20, which results in greater coupling stability. The rectangular member 32 is preferably transparent. FIG. 5B is a third variation of the fourth example of the flame simulating device 10 of FIG. 5, comprising an essentially rectangular flame simulating member 12 substantially perpendicular to an essentially rectangular flame simulating member 30 and each of the essentially rectangular flame simulating members 12, 30 is substantially perpendicular to an extended essentially rectangular member 32. The extended essentially rectangular member 32 is also substantially perpendicular to a greater portion of an inner surface of the essentially rectangular flame simulating member 12 compared to the second variation of the fourth example. In use, the third variation of the fourth example of the flame simulating device 10 incorporating the essentially rectangular member 32 is coupled to a portion of each one of a surface of a member and a substantially perpendicular member of a vehicle lens fixture 20, which results in even greater coupling stability compared to the second variation of the fourth example the flame simulating device 10. The fourth examples of the flame simulating device 10 provide the appearance of flames emanating in a vertical and horizontal direction projecting away from a portion of the surface of the substantially perpendicular member of the vehicle light lens fixture 20.

Figure 6:
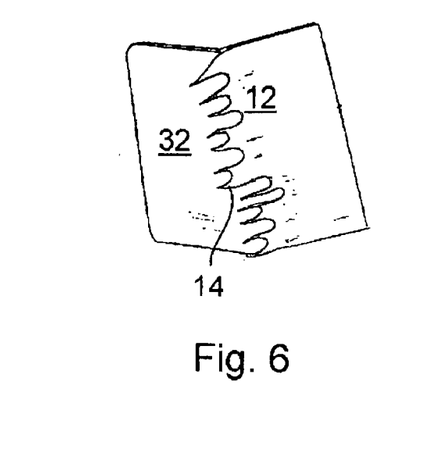
FIG. 6 is a perspective view of a fifth embodiment of a flame simulating device of FIG. 1.

FIG. 6 is a fifth example of a flame simulating device 10 comprising an essentially rectangular flame simulating member 12 and an essentially rectangular member 32. The extended essentially rectangular member 32 is substantially perpendicular to a portion of an inner surface of the essentially rectangular flame simulating member 12. In use, the integral assembly of the flame simulating device 10 incorporating the essentially rectangular member 32 is coupled to a portion of each one of a surface of a member and a substantially perpendicular member of a vehicle lens fixture 20, which results in even greater coupling stability compared to the first example of the flame simulating device 10. It is understood that in any variation of the fourth or fifth examples, that a portion of the essentially rectangular flame simulating member 12 near the opposite end 16 of the essentially rectangular flame simulating member 12 defines a multiplicity of holes 18 for allowing access to couplers such as screws of a vehicle light lens fixture 20 when it is desired to replace any bulbs of the vehicle light lens fixture 20. The fifth example of the simulating device 10 provides the appearance of flames emanating from an edge portion of the surface of the substantially perpendicular member of the vehicle light lens fixture 20.

Figure 7:
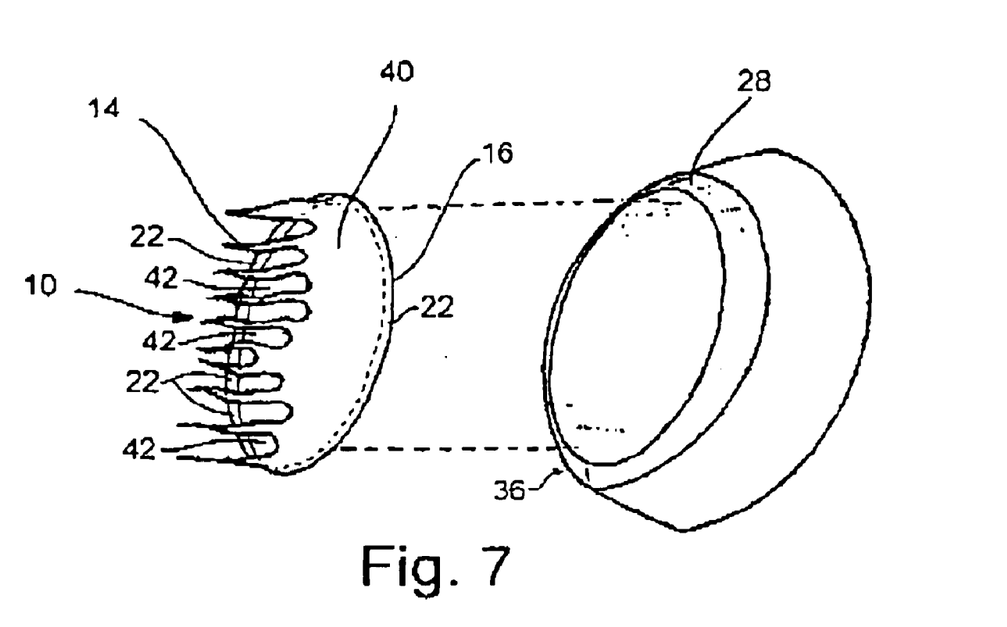
FIG. 7 is a perspective view of another vehicle light lens fixture and a sixth embodiment of a flame simulating device in position to be coupled to the another type of vehicle light lens fixture.

Referring to FIG. 7 in a sixth example of a flame simulating device 10, a first variation of the sixth example of the flame simulating device 10 comprises a partially curved flame simulating member 40, in Which a flame shaped end 14 of an extended portion of the partially curved flame simulating member 40 and an opposite end 16 of the extended portion of the partially curved flame simulating member 40 are integrally coupled to a curved portion of the partially curved flame simulating member 40. The opposite end 16 and the curved portion of the partially curved flame simulating member 40 define an opening 42 of the partially curved flame simulating member 40. In use, the opposite end 16 and curved portion of the partially curved flame simulating member 40 are coupled to a rim 28 of an essentially circular vehicle light lens fixture 36.

A second variation of the sixth example of the flame simulating device 10 of FIG. 7 comprises a partially curved flame simulating member 40, in which a flame shaped end 14 of an extended portion of the partially curved flame simulating member 40 and an opposite end 16 of the extended portion of the partially curved flame simulating member 40 are integrally coupled to a curved portion of the partially curved flame simulating member 40 and the opposite end 16 and curved portion of the partially curved flame simulating member 40 are coupled to a transparent member. In use, the opposite end 16 and curved portion of the partially curved flame simulating member 40 as well as the transparent member are coupled to a portion of a surface of an essentially circular vehicle light lens fixture 36. The second variation of the sixth example of the flame simulating device 10 provides greater coupling stability compared to the first variation of the sixth example of the flame simulating device 10. The sixth examples of the flame simulating device 10 to provide the appearance of flames emanating from a portion of an outer surface portion of the essentially circularly shaped light lens fixture 36.

Each embodiment of the flame simulating device 10 preferably comprises a plastic that is environmentally stable. Examples include, but are not limited to various grades of polyethylene, polypropylene and mixed polymers thereof. The plastic materials are preferably translucent, except for transparent members discussed above, so that light emanating from the vehicle light lens or from existing light is reflected, refracted, caused to be luminescent, fluoresced or diffused by the flame simulating device 10, to give the appearance of flames. The plastic materials may also be textured and etched to further enhance indirect lighting effects. The plastic materials are also preferably colored to give the appearance of flames. Colors include shades of all the spectral colors. Colors also include mixtures of all colors, as streaks or other configurations, which enhance the appearance of flames.

In summary, a flame simulating device for a vehicle comprises an assembly having a flame shaped end and an opposite end. In several embodiments of the flame simulating device the opposite end of the assembly is coupled to a transparent member. In use of the flame simulating device, a portion of the opposite end of the assembly is coupled to a portion of a surface of a vehicle light lens fixture. Six different examples of the flame simulating device are disclosed. The flame simulating device preferably comprises translucent plastic, except when a member of the assembly is the transparent member. The flame simulating device may be colored and textured to give the appearance of flames emanating from a vehicle. A source of light creates a simulated flame when the source of light is directed onto the translucent flame simulating device.

While the invention has been particularly shown and described with reference to preferred embodiments thereof, it will be understood by those skilled in the art that the foregoing and other changes in form and details may be made therein without departing from the spirit and scope of the invention. For example, each of the examples of the flame simulating device may be used on various types of vehicle light lens fixtures. Vehicles include, but are not limited to automobiles, motorcycles, bicycles and trucks. The flame simulating device may be coupled to a portion surrounding a surface of a vehicle light lens fixture. The flame simulating device may be coupled to side vehicle light lens fixtures as well as to rear vehicle light lens fixtures. The flame simulating device may also protect a vehicle light lens from flying debris.

What is claimed is:

1. A flame simulating device for a vehicle comprising, in combination:

a source of light coupled to the vehicle;

a translucent flame simulating device coupled to the vehicle that creates a simulated flame when the source of light is directed onto the translucent flame simulating device; and said translucent flame simulating device comprising an assembly, a portion of said assembly having a flame shaped end, said assembly having an opposite end, a portion of said opposite end for coupling to a portion of an outer surface of a vehicle light lens fixture giving the appearance of flames emanating from the vehicle light lens fixture, said assembly comprising an essentially rectangular member, a portion of said essentially rectangular member near said opposite end defining a multiplicity of holes for allowing access to retaining couplers of the vehicle light lens fixture.

2. The flame simulating device for a vehicle according to claim 1, wherein the light source is a vehicle light.

3. The flame simulating device for a vehicle according to claim 1, wherein said opposite end of said assembly coupled to a portion of a surface surrounding a vehicle light lens fixture giving the appearance of flames emanating from areas surrounding the vehicle light lens fixture.

4. The flame simulating device for a vehicle according to claim 1 further comprising a second essentially rectangular member, said second essentially rectangular member substantially perpendicular to said first essentially rectangular member; an edge of said essentially rectangular second member coupled to a portion of an inner surface of said essentially rectangular first member; a portion of the inner surface of said essentially rectangular first member and an inner surface of said essentially rectangular second member for coupling to a portion of the outer surface of the vehicle light lens fixture.

5. The flame simulating device for a vehicle according to claim 1 further comprising a second essentially rectangular member having a flame shaped end, said second essentially rectangular member having an opposite end; said opposite end of said second essentially rectangular member for coupling to a portion of another outer surface of the vehicle light lens fixture, said second essentially rectangular member substantially perpendicular to said first essentially rectangular member when said first essentially rectangular member coupled to a portion of the outer surface of the vehicle light lens fixture.

6. The flame simulating device for a vehicle according to claim 1 wherein said assembly comprises an essentially cylindrical member, said flame shaped end essentially circularly disposed at one end of said essentially cylindrical member, said essentially cylindrical member having a lip at said opposite end of said essentially cylindrical member, a portion of said lip for coupling to a portion of the outer surface of the vehicle light lens fixture giving the appearance of flames emanating from a rim of the vehicle light lens fixture.

7. The flame simulating device for a vehicle according to claim 1 wherein said assembly comprises a pair of tapering members and a support cross member, each one of said pair of tapering members having a base coupled to said support cross member, a tapering member of said pair of tapering members substantially perpendicular to another tapering member of said pair of tapering members, said support cross member for coupling to a portion of the outer surface of the vehicle light lens fixture.

8. The flame simulating device for a vehicle according to claim 1 wherein said assembly comprises a partially curved member defining a curved portion of a portion of said opposite end of said partially curved member, said partially curved member defining a flame portion extending from another portion of said opposite end to said flame shaped end, said curved portion and said flame portion at said opposite end of said partially curved member defining an opening; each one of said curved portion and said flame portion of said opposite end for coupling to a portion of the outer surface of the vehicle light lens.

9. The flame simulating device for a vehicle according to claim 1 wherein said flame simulating device comprises translucent plastic.

10. The flame simulating device for a vehicle according to claim 4 further comprising a third essentially rectangular member having a flame shaped end and an opposite end; said third essentially rectangular member substantially perpendicular to said first essentially rectangular member, said third essentially rectangular member substantially perpendicular to said second rectangular member; said opposite end of said third essentially rectangular member coupled to a second edge of said second essentially rectangular member; said essentially rectangular first member, said essentially rectangular second member and said third rectangular member for coupling to a portion of outer surfaces of the vehicle light lens fixture.

11. The flame simulating device for a vehicle according to claim 4 further comprising a third essentially rectangular member having a flame shaped end and an opposite end; said third essentially rectangular member substantially perpendicular to said first essentially rectangular member, said third essentially rectangular member substantially perpendicular to said second rectangular member; said opposite end of said third essentially rectangular member coupled to a portion of an inner surface of said second essentially rectangular member; said essentially rectangular first member, said essentially rectangular second member and said third rectangular member for coupling to a portion of outer surfaces of the vehicle light lens fixture.

12. The flame simulating device for a vehicle according to claim 6 wherein said lip substantially perpendicular to a wall of said essentially cylindrical member, said lip defining an opening of said essentially cylindrical member so that light emanating from the vehicle light lens fixture gives the appearance of flames.

13. The flame simulating device for a vehicle according to claim 6 wherein said lip coupled to a transparent member; each one of said lip and said transparent member for coupling to a portion of the outer surface of the vehicle light lens fixture.

14. The flame simulating device for a vehicle according to claim 7 wherein said support cross member coupled to a transparent member; each one of said support cross member and said transparent member for coupling to a portion of the outer surface of the vehicle light lens fixture.

15. The flame simulating device for a vehicle according to claim 7 wherein said support cross member coupled to a lip; each one of said support cross member and said lip for coupling to a portion of the outer surface of the vehicle light lens fixture.

16. The flame simulating device for a vehicle according to claim 8 further comprising a transparent member coupled to said opposite end of said partially curved member; each one of said opposite end and said transparent member for coupling to a portion of the outer surface of the vehicle light lens fixture.

17. The flame simulating device for a vehicle according to claim 15 wherein said support cross member coupled to a transparent member, said lip coupled to said transparent member; each one of said support cross member, said lip and said transparent member for coupling to a portion of the outer surface of the vehicle light lens fixture.

18. A method for giving the appearance of flames emanating from a vehicle comprising the steps of:
providing a source of light coupled to the vehicle; coupling a translucent flame simulating device to the vehicle that creates a simulated flame when the source of light is directed onto the translucent flame simulating device; and
providing said translucent flame simulating device comprising an assembly, a portion of said assembly having a flame shaped end, said assembly having an opposite end, a portion of said opposite end for coupling to a portion of an outer surface of a vehicle light lens fixture of the vehicle and projecting away from a portion of the surface of the vehicle light lens fixture of the vehicle thereby giving the appearance of flames emanating from the vehicle light lens fixture.

19. The method according to claim 18 further comprising the step of: coupling said assembly having an essentially rectangular member to retaining couplers of the vehicle light lens fixture, a portion of said essentially rectangular member near said opposite end of said assembly defining a multiplicity of holes for allowing access to said retaining couplers of the vehicle light lens fixture.

20. The method according to claim 18 further comprising the step of: coupling said assembly having an essentially cylindrical member to a portion of the outer surface of the vehicle light lens fixture, said flame shaped end essentially circularly disposed at one end of said essentially cylindrical member, said essentially cylindrical member having a lip at said opposite end of said essentially cylindrical member thereby giving the appearance of flames emanating from a rim of the vehicle light lens fixture.

* * * * *